United States Patent
Caveney, Jr. et al.

(10) Patent No.: US 9,116,641 B2
(45) Date of Patent: Aug. 25, 2015

(54) MARKET-BASED LABELING SYSTEM AND METHOD

(75) Inventors: Jack E. Caveney, Jr., Woodridge, IL (US); Barry O. Page, Woodstock, GA (US)

(73) Assignee: Panduit Corp., Tinley Park, IL (US)

( * ) Notice: Subject to any disclaimer, the term of this patent is extended or adjusted under 35 U.S.C. 154(b) by 634 days.

(21) Appl. No.: 11/290,900

(22) Filed: Nov. 30, 2005

(65) Prior Publication Data

US 2006/0114487 A1 Jun. 1, 2006

Related U.S. Application Data

(60) Provisional application No. 60/631,762, filed on Nov. 30, 2004.

(51) Int. Cl.
*G06F 7/00* (2006.01)
*G06F 3/12* (2006.01)
*B41J 3/407* (2006.01)

(52) U.S. Cl.
CPC ............. *G06F 3/1205* (2013.01); *B41J 3/4075* (2013.01); *G06F 3/1253* (2013.01); *G06F 3/1285* (2013.01)

(58) Field of Classification Search
USPC ............................. 400/88, 120.01; 707/1, 26
IPC ................................................ G06F 7/00,17/60
See application file for complete search history.

(56) References Cited

U.S. PATENT DOCUMENTS

| 3,783,083 A | 1/1974 | Jenkins |
| 3,798,106 A | 3/1974 | Jenkins, at al. |
| 4,386,862 A | 6/1983 | Kittel et al. |
| 4,439,257 A | 3/1984 | Sato et al. |
| 4,497,682 A | 2/1985 | Hamisch, Jr. |

(Continued)

FOREIGN PATENT DOCUMENTS

| JP | 11115251 A | * | 4/1999 |
| JP | HEI 11-328167 | | 11/1999 |
| JP | 2000-099500 | | 4/2000 |

*Primary Examiner* — Nguyen Ha
(74) *Attorney, Agent, or Firm* — Christopher S. Clancy; Yuri Astvatsaturov (57) ABSTRACT

A market-based labeling system and method provides tools to assist a user in accurately generating labels. The system includes a processor-based device, such as a computer, that has associated input/output devices, such as a keyboard and a display. The processor-based device also includes a user-friendly labeling application, which may be implemented as a set of instructions to be executed by the processor. The labeling application may guide the user through a series of steps to produce a set of labels. The labeling application preferably generates the user interfaces and a file that may be viewed, edited, saved and/or printed on an associated printer. The labeling application may include one or more modules, each module being geared toward labels for a particular market. This labeling application tool may run on a general purpose processor, such as a computer, and may interface with general purpose labeling software. Alternatively, the labeling application tool may be embedded in a labeling device, such as a portable hand-held printer. Also, methods are provided for quickly and accurately generating labels by adapting a labeling application tool to the user and the user's market. For example, one method allows a user to select between a guided, interview-type process for identifying labeling requirements and a user-directed process for identifying labeling requirements. The methods may be implemented in software.

18 Claims, 8 Drawing Sheets

(56) References Cited

U.S. PATENT DOCUMENTS

| | | | |
|---|---|---|---|
| 4,505,773 A | 3/1985 | Sato et al. | |
| 4,556,442 A | 12/1985 | Torbeck | |
| 4,591,404 A | 5/1986 | Hamisch, Jr. | |
| 4,591,879 A | 5/1986 | Yokota et al. | |
| 4,609,295 A | 9/1986 | Shimodaira | |
| 4,623,418 A | 11/1986 | Gombrich et al. | |
| 4,647,235 A | 3/1987 | Sato | |
| 4,650,351 A | 3/1987 | Engle et al. | |
| 4,674,056 A | 6/1987 | Goodfellow | |
| 4,680,081 A | 7/1987 | Hamisch, Jr. | |
| 4,685,817 A | 8/1987 | Surti | |
| 4,702,631 A | 10/1987 | Watanabe | |
| 4,706,095 A | 11/1987 | Ono et al. | |
| 4,725,157 A | 2/1988 | Nakai et al. | |
| 4,727,245 A | 2/1988 | Dobbins et al. | |
| 4,737,229 A | 4/1988 | Vanderpool et al. | |
| 4,741,640 A | 5/1988 | Yoshioka | |
| 4,753,545 A | 6/1988 | Kohlhage et al. | |
| 4,797,018 A | 1/1989 | Hofmann et al. | |
| 4,806,033 A | 2/1989 | Ukmar et al. | |
| 4,815,875 A | 3/1989 | Richardson et al. | |
| 4,830,522 A | 5/1989 | Sato et al. | |
| 4,838,718 A | 6/1989 | Okumura et al. | |
| 4,844,629 A | 7/1989 | Hoyt | |
| 4,871,269 A | 10/1989 | Murata | |
| 4,917,514 A | 4/1990 | Richardson et al. | |
| 4,920,882 A | 5/1990 | Hoyt | |
| 4,930,913 A | 6/1990 | Basile | |
| 4,934,847 A | 6/1990 | Shiozaki et al. | |
| 4,952,086 A | 8/1990 | Yamaguchi | |
| 5,013,388 A | 5/1991 | Goodwin et al. | |
| 5,015,324 A | 5/1991 | Goodwin et al. | |
| 5,022,771 A | 6/1991 | Paque | |
| 5,049,898 A | 9/1991 | Arthur et al. | |
| 5,056,940 A | 10/1991 | Basile | |
| 5,069,563 A | 12/1991 | Daggs | |
| 5,078,523 A | 1/1992 | McGourty et al. | |
| 5,110,226 A | 5/1992 | Sherman et al. | |
| 5,111,216 A | 5/1992 | Richardson et al. | |
| 5,143,461 A | 9/1992 | Inoue et al. | |
| 5,149,211 A * | 9/1992 | Pettigrew et al. | 400/88 |
| 5,160,205 A | 11/1992 | Mistyurik | |
| 5,160,943 A | 11/1992 | Pettigrew et al. | |
| 5,165,806 A | 11/1992 | Collins | |
| 5,181,788 A | 1/1993 | Norman, Jr. et al. | |
| 5,184,152 A | 2/1993 | French | |
| 5,188,469 A | 2/1993 | Nagao et al. | |
| 5,224,784 A | 7/1993 | Haftmann et al. | |
| 5,262,804 A | 11/1993 | Petigrew et al. | |
| 5,266,968 A | 11/1993 | Stephenson | |
| 5,277,504 A | 1/1994 | Takeda | |
| 5,284,396 A | 2/1994 | Masumura et al. | |
| 5,294,203 A | 3/1994 | Williams | |
| 5,294,782 A | 3/1994 | Kumar | |
| 5,295,753 A | 3/1994 | Godo et al. | |
| 5,297,879 A | 3/1994 | Oikawa | |
| 5,318,370 A | 6/1994 | Nehowig | |
| 5,320,437 A | 6/1994 | Malke et al. | |
| 5,363,134 A | 11/1994 | Barbehenn et al. | |
| 5,365,312 A | 11/1994 | Hillmann et al. | |
| 5,374,132 A | 12/1994 | Kimura | |
| 5,411,339 A | 5/1995 | Bahrabadi et al. | |
| 5,415,482 A | 5/1995 | Poole et al. | |
| 5,424,757 A | 6/1995 | Thom | |
| 5,427,029 A | 6/1995 | Dumke | |
| 5,431,504 A | 7/1995 | Beadman et al. | |
| 5,437,511 A | 8/1995 | Halket et al. | |
| 5,454,650 A | 10/1995 | Yamaguchi | |
| 5,455,617 A | 10/1995 | Stephenson et al. | |
| 5,469,774 A | 11/1995 | Kaspers | |
| 5,483,624 A | 1/1996 | Christopher et al. | |
| 5,486,259 A | 1/1996 | Goodwin et al. | |
| 5,507,583 A | 4/1996 | Beaty et al. | |
| 5,533,818 A | 7/1996 | Bahrabadi | |
| 5,542,487 A | 8/1996 | Schultz et al. | |
| 5,549,401 A | 8/1996 | Ishikawa et al. | |
| 5,593,237 A | 1/1997 | Nozaki et al. | |
| 5,605,403 A | 2/1997 | Vegeais et al. | |
| 5,607,244 A | 3/1997 | Satoh et al. | |
| 5,610,635 A | 3/1997 | Murray et al. | |
| 5,622,440 A | 4/1997 | Yamamoto et al. | |
| 5,676,478 A | 10/1997 | Bowman et al. | |
| 5,699,091 A | 12/1997 | Bullock et al. | |
| 5,708,462 A | 1/1998 | Helmbold et al. | |
| 5,711,623 A | 1/1998 | Nose | |
| 5,718,525 A | 2/1998 | Bruhnke et al. | |
| 5,727,888 A | 3/1998 | Sugimoto et al. | |
| 5,757,394 A | 5/1998 | Gibson et al. | |
| 5,758,980 A | 6/1998 | Takenaka | |
| 5,788,384 A | 8/1998 | Goodwin et al. | |
| 5,788,388 A | 8/1998 | Cowger et al. | |
| 5,812,156 A | 9/1998 | Bullock et al. | |
| 5,816,717 A | 10/1998 | Beadman et al. | |
| 5,820,277 A | 10/1998 | Schulte | |
| 5,820,280 A | 10/1998 | Fox | |
| 5,831,649 A | 11/1998 | Watrobski et al. | |
| 5,835,817 A | 11/1998 | Bullock et al. | |
| 5,859,656 A | 1/1999 | Aragon et al. | |
| 5,860,363 A | 1/1999 | Childers et al. | |
| 5,861,897 A | 1/1999 | Ide et al. | |
| 5,885,012 A | 3/1999 | Hastings et al. | |
| 5,906,444 A | 5/1999 | Jorgensen | |
| 5,918,989 A | 7/1999 | Stout, Jr. et al. | |
| 5,933,589 A | 8/1999 | Hidaka et al. | |
| 5,938,350 A | 8/1999 | Colonel | |
| 5,951,177 A | 9/1999 | Schanke et al. | |
| 6,006,661 A | 12/1999 | Tukahara et al. | |
| 6,019,449 A | 2/2000 | Bullock et al. | |
| 6,019,461 A | 2/2000 | Yoshimura et al. | |
| 6,065,824 A | 5/2000 | Bullock et al. | |
| 6,067,103 A | 5/2000 | Ewert et al. | |
| 6,075,594 A * | 6/2000 | Thomas et al. | 356/328 |
| 6,082,914 A | 7/2000 | Barrus et al. | |
| 6,089,768 A | 7/2000 | Barrus et al. | |
| 6,099,178 A | 8/2000 | Spurr et al. | |
| 6,109,723 A | 8/2000 | Castle et al. | |
| 6,113,293 A | 9/2000 | Schanke et al. | |
| 6,116,717 A | 9/2000 | Anderson et al. | |
| 6,124,941 A | 9/2000 | Bothner et al. | |
| 6,126,265 A | 10/2000 | Childers et al. | |
| 6,129,463 A | 10/2000 | Lau et al. | |
| RE36,953 E | 11/2000 | Lodwig et al. | |
| 6,142,686 A | 11/2000 | Schanke et al. | |
| 6,151,041 A | 11/2000 | Bolash et al. | |
| 6,155,664 A | 12/2000 | Cook | |
| 6,158,837 A | 12/2000 | Hilton et al. | |
| 6,158,850 A | 12/2000 | Cook | |
| 6,161,915 A | 12/2000 | Bolash et al. | |
| 6,196,670 B1 | 3/2001 | Saruta | |
| 6,227,643 B1 | 5/2001 | Purcell et al. | |
| 6,267,521 B1 | 7/2001 | Lodwig et al. | |
| 6,277,456 B1 | 8/2001 | Bulgrin et al. | |
| 6,290,321 B1 | 9/2001 | Murray et al. | |
| 6,307,583 B1 | 10/2001 | Randolph et al. | |
| 6,315,381 B1 | 11/2001 | Wade et al. | |
| 6,315,471 B1 | 11/2001 | Hsieh et al. | |
| 6,317,145 B1 | 11/2001 | Myung | |
| 6,361,138 B1 | 3/2002 | Scino et al. | |
| 6,361,228 B1 | 3/2002 | Barrus et al. | |
| 6,364,552 B1 | 4/2002 | Nehowig et al. | |
| 6,371,586 B1 | 4/2002 | Saruta | |
| 6,371,670 B1 | 4/2002 | Kojo | |
| 6,375,298 B2 | 4/2002 | Purcell et al. | |
| 6,375,301 B1 | 4/2002 | Childers et al. | |
| 6,379,059 B2 | 4/2002 | Kaplan | |
| 6,416,152 B1 | 7/2002 | Matsuzaki et al. | |
| 6,416,166 B1 | 7/2002 | Robinson et al. | |
| 6,428,225 B1 | 8/2002 | Nguyen et al. | |
| 6,431,670 B1 | 8/2002 | Schantz et al. | |
| 6,431,680 B1 | 8/2002 | Shinada | |
| 6,431,681 B2 | 8/2002 | Hatasa et al. | |
| 6,431,703 B2 | 8/2002 | Rousseau et al. | |
| 6,435,676 B1 | 8/2002 | Murray et al. | |
| 6,447,090 B1 | 9/2002 | Saruta | |

(56) References Cited

U.S. PATENT DOCUMENTS

| | | |
|---|---|---|
| 6,458,208 B1 | 10/2002 | Anai et al. |
| 6,459,860 B1 | 10/2002 | Childers |
| 6,474,771 B2 | 11/2002 | Kim |
| 6,491,454 B1 | 12/2002 | Toyosawa et al. |
| 6,494,559 B1 | 12/2002 | Tsuji |
| 6,497,469 B1 | 12/2002 | Shinada et al. |
| 6,502,916 B1 | 1/2003 | Naka |
| 6,502,917 B1 | 1/2003 | Shinada et al. |
| 6,503,005 B1 | 1/2003 | Cockerill et al. |
| 6,505,926 B1 | 1/2003 | Trafton et al. |
| 6,533,383 B1 | 3/2003 | Saruta et al. |
| 6,536,888 B2 | 3/2003 | Trafton et al. |
| 6,547,363 B1 | 4/2003 | Shinada et al. |
| 6,547,364 B2 | 4/2003 | Silverbrook |
| 6,565,184 B1 | 5/2003 | Numata et al. |
| 6,565,198 B2 | 5/2003 | Saruta et al. |
| 6,585,345 B2 | 7/2003 | Kosugi |
| 6,588,871 B2 | 7/2003 | Studholme et al. |
| 6,588,872 B2 | 7/2003 | Anderson et al. |
| 6,604,874 B2 | 8/2003 | Carriere et al. |
| 6,607,262 B2 | 8/2003 | Paul et al. |
| 6,607,316 B1 | 8/2003 | Petteruti et al. |
| 6,609,788 B2 | 8/2003 | Hatasa et al. |
| 6,609,844 B1 | 8/2003 | Petteruti et al. |
| 6,616,260 B2 | 9/2003 | Skene et al. |
| 6,629,791 B2 | 10/2003 | Penzo |
| 6,631,967 B1 | 10/2003 | Saruta |
| 6,634,738 B1 | 10/2003 | Shinada et al. |
| 6,634,814 B2 | 10/2003 | Spurr et al. |
| 6,634,817 B2 | 10/2003 | Serizawa |
| 6,637,957 B2 | 10/2003 | Mastinick et al. |
| 6,644,771 B1 | 11/2003 | Silverbrook |
| 6,644,876 B2 | 11/2003 | Carriere et al. |
| 6,648,445 B2 | 11/2003 | Ishizawa et al. |
| 6,652,170 B1 | 11/2003 | Arnold |
| 6,666,540 B2 | 12/2003 | Asauchi |
| 6,672,695 B1 | 1/2004 | Naka et al. |
| 6,709,179 B2 | 3/2004 | Yamaguchi et al. |
| 6,712,459 B2 | 3/2004 | Petranek |
| 6,714,209 B2 | 3/2004 | Van Valer |
| 6,719,397 B1 | 4/2004 | Hu et al. |
| 6,732,619 B2 | 5/2004 | Carriere et al. |
| 6,753,894 B2 | 6/2004 | Yoshida |
| 6,764,155 B2 | 7/2004 | D'Souza et al. |
| 6,769,757 B2 | 8/2004 | Skene et al. |
| 6,789,864 B2 | 9/2004 | Phillips |
| 6,793,305 B2 | 9/2004 | Tsukada et al. |
| 6,796,646 B2 | 9/2004 | Komplin et al. |
| 6,808,255 B1 | 10/2004 | Haines et al. |
| 6,817,693 B2 | 11/2004 | Phillips et al. |
| 6,820,972 B2 | 11/2004 | Kinalski |
| 6,827,417 B2 | 12/2004 | Seino |
| 6,830,323 B2 | 12/2004 | Perkins et al. |
| 6,830,391 B2 | 12/2004 | Clayvon et al. |
| 6,832,830 B2 | 12/2004 | Seino et al. |
| 6,834,945 B2 | 12/2004 | Ishizawa et al. |
| 6,835,013 B2 | 12/2004 | Dunn et al. |
| 6,837,565 B2 | 1/2005 | Studholme et al. |
| 6,851,799 B2 | 2/2005 | Trafton et al. |
| 6,860,592 B2 | 3/2005 | Chen et al. |
| 6,866,359 B2 | 3/2005 | Pan et al. |
| 6,923,531 B2 | 8/2005 | Saruta |
| 6,935,716 B2 | 8/2005 | Hatasa et al. |
| 6,955,411 B2 | 10/2005 | Saruta |
| 6,955,422 B2 | 10/2005 | Miyazawa et al. |
| 6,969,140 B2 | 11/2005 | Saruta |
| 6,979,079 B2 | 12/2005 | Hashii et al. |
| 6,984,020 B2 | 1/2006 | Shinada et al. |
| 6,990,485 B2 | 1/2006 | Forman et al. |
| 6,994,415 B2 | 2/2006 | Asauchi et al. |
| 6,995,858 B2 | 2/2006 | Murakami et al. |
| 7,033,009 B2 | 4/2006 | Shinada et al. |
| 7,033,097 B2 | 4/2006 | Petteruti et al. |
| 7,048,348 B2 | 5/2006 | Mochizuki et al. |
| 7,056,040 B2 | 6/2006 | Silverbrook et al. |
| 7,077,506 B2 | 7/2006 | Chen |
| 7,077,512 B2 | 7/2006 | Kobayashi et al. |
| 7,101,012 B2 | 9/2006 | Kosugi et al. |
| 7,104,724 B2 | 9/2006 | Terry |
| 7,110,127 B2 | 9/2006 | Walker et al. |
| 7,117,211 B2 * | 10/2006 | Whittingham et al. ......... 707/10 |
| 7,128,408 B2 | 10/2006 | Kosugi |
| 7,134,738 B2 | 11/2006 | Saruta |
| 7,137,682 B2 | 11/2006 | Asauchi |
| 7,182,445 B2 | 2/2007 | Johnson et al. |
| 2002/0063760 A1 | 5/2002 | Dietl et al. |
| 2002/0085051 A1 | 7/2002 | Saruta |
| 2002/0085075 A1 | 7/2002 | Shinada et al. |
| 2002/0152087 A1 * | 10/2002 | Gonzalez ........................ 705/1 |
| 2002/0167574 A1 | 11/2002 | Shinada et al. |
| 2002/0180823 A1 | 12/2002 | Shinada et al. |
| 2002/0194074 A1 * | 12/2002 | Jacobs ............................. 705/16 |
| 2002/0196302 A1 | 12/2002 | Saruta |
| 2003/0004946 A1 * | 1/2003 | VanDenAvond et al. ......... 707/9 |
| 2003/0018897 A1 * | 1/2003 | Bellis et al. .................. 713/182 |
| 2003/0031494 A1 | 2/2003 | Cockerill et al. |
| 2003/0058296 A1 | 3/2003 | Shinada et al. |
| 2003/0061217 A1 * | 3/2003 | Whittingham et al. ......... 707/10 |
| 2003/0128248 A1 | 7/2003 | Kosugi |
| 2003/0131011 A1 * | 7/2003 | Haunschild et al. .......... 707/100 |
| 2003/0160839 A1 | 8/2003 | Kosugi |
| 2003/0214546 A1 | 11/2003 | Hatasa et al. |
| 2003/0217036 A1 * | 11/2003 | Haunschild et al. ............... 707/1 |
| 2003/0229543 A1 * | 12/2003 | Zimmerman et al. .......... 705/26 |
| 2004/0066435 A1 | 4/2004 | Lester et al. |
| 2004/0070774 A1 | 4/2004 | Ishibashi et al. |
| 2004/0095407 A1 | 5/2004 | Saruta |
| 2004/0122733 A1 * | 6/2004 | Hanschen et al. ............... 705/14 |
| 2004/0125405 A1 * | 7/2004 | Salomon et al. ............. 358/1.18 |
| 2004/0128272 A1 * | 7/2004 | Salomon et al. ................... 707/1 |
| 2004/0207674 A1 | 10/2004 | Otsuki |
| 2004/0207865 A1 | 10/2004 | Wachter et al. |
| 2004/0212653 A1 | 10/2004 | Hetzer et al. |
| 2004/0223025 A1 | 11/2004 | D'souza et al. |
| 2004/0233470 A1 | 11/2004 | Wachter et al. |
| 2005/0044171 A1 * | 2/2005 | Bechtel et al. ................. 709/217 |
| 2005/0050052 A1 * | 3/2005 | Zimmerman et al. ........ 707/100 |
| 2005/0061878 A1 * | 3/2005 | Barenburg et al. ............ 235/385 |
| 2005/0114193 A1 * | 5/2005 | Kroening ........................ 705/8 |
| 2009/0226234 A1 * | 9/2009 | Obenshain .................... 400/218 |

* cited by examiner

| Panel Shop Wire and Cabling Wizard |
|---|

| What type of wire or cable are you labeling? |
|---|

☐ 18 – 16 AWG

☐ 14 – 10 AWG

☒ Cat 5/6

☐ 8 – 3 AWG

☐ 2 – 1 AWG

☐ 1/0 – 250 MCM      [ Next > ]  [ < Back ]  [ < Back ]

FIG. 5A

| Panel Shop Wire and Cabling Wizard |
|---|

| What type of material do you need? |
|---|

☒ Vinyl (Indoor General Purpose Self-Laminating, -40F (-40C) to 176F (80C)

☐ Tedia (Indoor/Ooutdoor Self-Laminating, -40F (-40C) to 225F (106C)

[ Next > ]  [ < Back ]  [ < Back ]

FIG. 5B

Panel Shop Wire and Cabling Wizard

Are you still using a thermal transfer table top printer?

☒ YES
☐ NO

[ Next > ] [ < Back ] [ < Back ]

FIG. 5C

Panel Shop Wire and Cabling Wizard

Would you like to use a standard serialization legend

☒ YES
☐ NO

[ Next > ] [ < Back ] [ < Back ]

MARKET-BASED LABELING SYSTEM AND METHOD

CROSS REFERENCE TO RELATED APPLICATION

This application claims the benefit of U.S. Provisional Application No. 60/631,762 filed Nov. 30, 2004, and is incorporated herein by reference in its entirety.

FIELD OF THE INVENTION

The present invention relates generally to labeling and, more particularly, to a system and method for printing labels, based upon market defined needs, in a manner that assists a user to produce labels for one or more specific applications.

BACKGROUND OF THE INVENTION

In many industries, personnel are responsible for producing identifiers, such as labels or tags, for use in association with products, components of products, cabling, network hardware, packaging, organization, etc. The labeling requirements for each product, for example, may be defined by one or more of a myriad of sources, ranging in form from undocumented industry usage, to proprietary specifications, to national and/or international standards. The specific labeling requirements vary depending, among other things, upon the market segment, the application and the job size. Educating personnel to be familiar with the specific labeling requirements of even one particular application may be a daunting and never-ending task, particularly in an area where the labeling requirements are regulated by continually evolving standards, such as the labeling of network hardware.

Labeling systems have been developed to assist users in creating labels. Known labeling systems, however, suffer from being either (i) so generalized that the user is required to have significant specialized knowledge about the particular application, which adds time, increases the potential for errors in label generation, and limits the user's ability to become proficient with a variety of labeling applications, or (ii) so specific that the user cannot utilize the labeling system outside of the narrow application for which it was developed. Thus, improved labeling systems and methods are needed.

DETAILED DESCRIPTION OF THE PRESENTLY PREFERRED EMBODIMENTS

I. Overview

In accordance with the presently preferred embodiments, tools are provided to assist a user in accurately generating labels. In one embodiment, the tool is an apparatus or system for generating labels. The system includes a processor-based device, such as a computer, that has input/output devices, such as a keyboard and a display. The processor-based device also includes a user-friendly labeling application, which may be implemented as a set of instructions to be executed by the processor. As described in detail below, the labeling application is capable of guiding the user through a series of steps in order to produce quickly and accurately a complete set of labels, without requiring that the user have attained a substantial knowledge of the items that are to be labeled. The labeling application preferably generates the user interfaces and a file that may be viewed, edited, saved and/or printed on an associated printer.

In another embodiment, the tool is a labeling application that includes one or more modules, each module being geared toward labels for a particular market. This labeling application tool may run on a general purpose processor, such as a computer, and may interface with general purpose labeling software. In such a case, the general purpose processor is coupled or connected to a printer that is capable of printing the resulting labels. In addition, the labeling application tool and/or general purpose labeling software may generate a file that may be viewed, edited, and/or saved in a memory structure that is available to the processor. Alternatively, the labeling application tool may be embedded in a labeling device, such as a portable hand-held printer.

In further embodiments, methods are provided for quickly and accurately generating labels. The methods, as described further below, adapt a labeling application tool to the user and the user's market. For example, one method allows a user to select between a guided, interview-type process for identifying labeling requirements and a user-directed process for identifying labeling requirements. The former, which may require some additional time, nonetheless allows a user with relatively less familiarity with the selected labeling market to accurately and completely generate the appropriate labels. The methods may be implemented in software.

II. An Example of a Suitable Network Architecture

Figure 1:
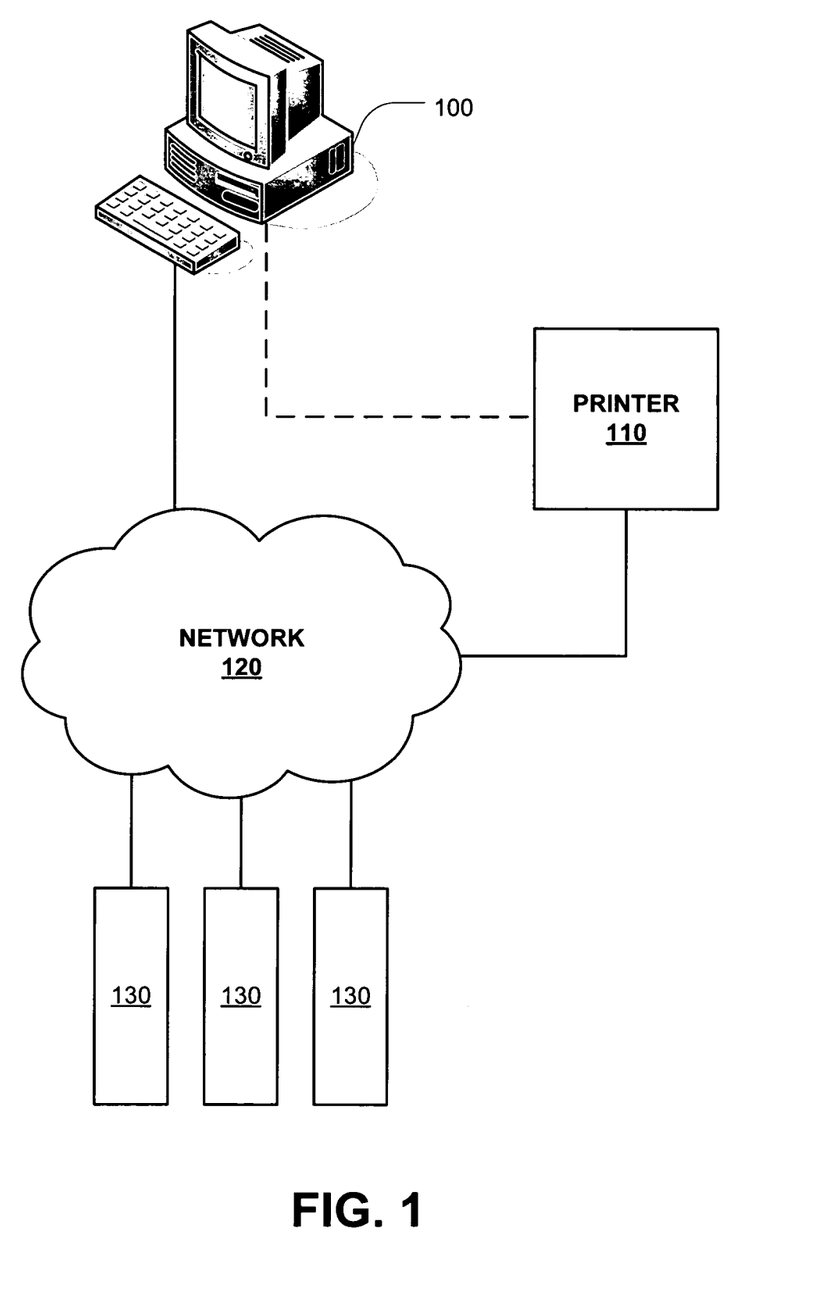
FIG. 1 is a schematic diagram of a network architecture in which the preferred embodiments may be implemented.

FIG. 1 is a schematic diagram of a network architecture in which preferred embodiments of a labeling system may be implemented. In FIG. 1, the network architecture includes a computer 100 that is coupled to a printer 110 through a network 120. As used herein, the term "computer" is used to refer to any device having a processor, associated memory and input/output devices, such as a keyboard, touchscreen and/or display. Thus, the computer 100 may be a personal computer, a network workstation, a personal digital assistant, or the like. In accordance with one embodiment, the memory associated with the computer 100 stores a labeling application, allowing a user to generate a file for printing labels using the computer 100, as further described below. The labeling application may alternatively reside in memory that is accessible to the computer 100 via the network 120. As described herein, the term "memory" refers to any type of data storage medium, such as Random Access Memory (RAM), Read-Only Memory (ROM), and optical or magnetic hard-drives or portable media.

The printer 110 may be a general purpose device, such as a portable or desk top laser, thermal transfer ink jet or dot matrix printer. Alternatively, the printer 110 may be specifically adapted for printing labels, such as a hand-held thermal transfer label printer. Hand-held thermal transfer label printers are commercially available from Panduit Corp., of Tinley Park, Ill., and others. Regardless of the type of printer 110 that is used, the computer 100 generates at least one output file or record containing the parameters of the print job and transmits the file or record to the printer 110. The computer 100 will typically include an appropriate printer driver. Rather than coupling to the computer 100 through the network 120, the printer 110 may alternatively be directly connected to the computer 100 (illustrated by the dashed line in FIG. 1), such as through a serial interface, USB interface, Infrared interface, Bluetooth interface, or any other interface that can be utilized for the point-to-point transmission of data.

The network 120 may be, for example, the Internet, a Local Area Network (LAN), a Wide Area Network (WAN), or a combination of LANs and/or WANs. Of course, those skilled in the art will recognize that other network architectures may alternatively be used. The preferred embodiments are not dependent on any particular networking protocol, but rather may utilize any protocol that is used by the computer 100 to communicate with the printer 110 via the network 120. Optionally, the network 120 also couples the computer 100 to additional resources 130. The resources 130 may include, for example, information databases, such as labeling specifications, labeling standards, product information and project drawings. These types of resources 130 may alternatively be stored in memory associated with the computer 100. The resources 130 may also include support for the labeling application, such as customer service and on-line upgrades.

III. The Labeling Application Tool

Figure 2:
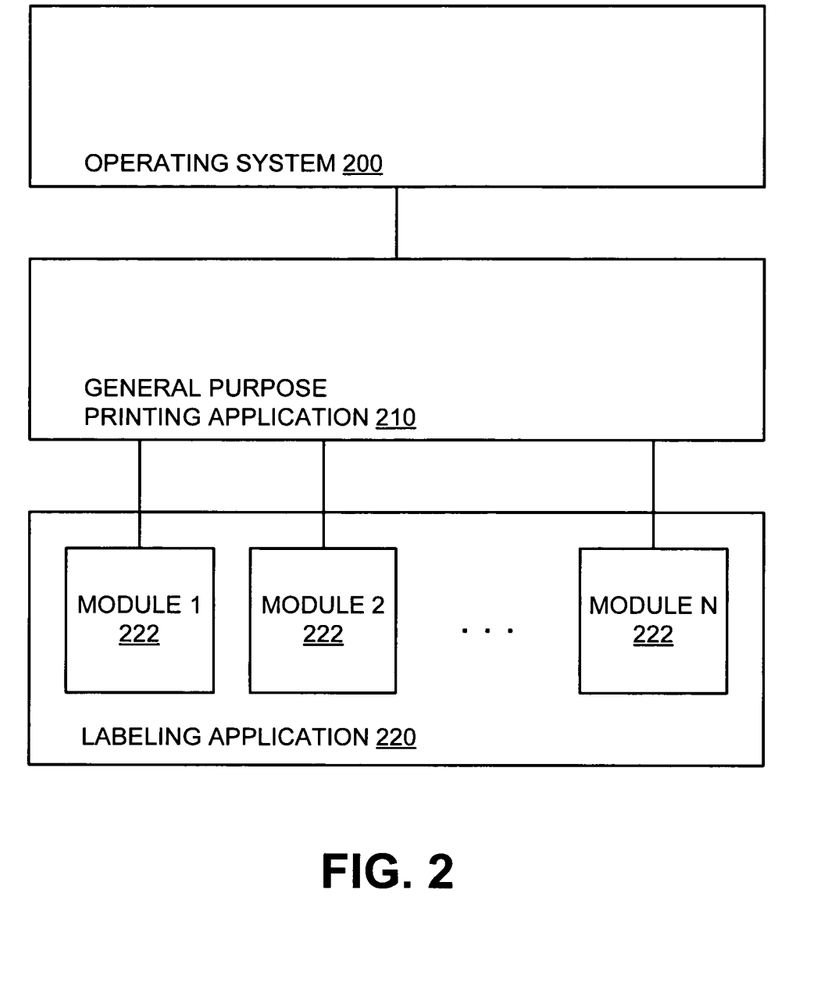
FIG. 2 is a schematic diagram illustrating a software hierarchy for a labeling application tool in accordance with a preferred embodiment.

FIG. 2 is a schematic diagram illustrating a software hierarchy for a labeling application tool in accordance with a preferred embodiment. An operating system 200 sits at the top level of the hierarchy. The operating system 200 is a software program that manages the basic operations of a computer, such as the computer 100 shown in FIG. 1. In one embodiment, the operating system 200 is WINDOWS 98 or higher, from Microsoft Corporation, although any other operating system may alternatively be used as long as it is capable of supporting the features and functions of the labeling application tool described herein. Examples of commercially available operating systems include WINDOWS, available from Microsoft Corporation, PALM OS, available from Palmsource, Inc. and LINUX, available from Red Hat.

A general purpose printing application 210 sits below the operating system 200. The general purpose printing application 210 is a software program that manages the printing function of a computer, such as the computer 100. A commercially available example of a general purpose printing application that is suitable for this purpose is the EASY-MARK Labeling Software, available from Panduit Corp.

The labeling application tool 220 sits below the general purpose printing application 210. Preferably, the labeling application tool 220 is implemented in software. As shown in FIG. 2, the labeling application tool 220 includes, for purposes of logical description, one or more modules 222, identified as module 1, module 2, . . . , module N, where N is an integer. In accordance with a preferred embodiment, each of the modules 222 guides a user in creating label information for a particular market. As used herein, the term "market" is a broad general term that may refer, for example, to a business field (e.g., Service Providers, Finance, Government, etc.), an industry (e.g., Transportation, Industrial, Manufacturing, Education, Healthcare etc.), a particular type of facility or infrastructure (e.g., Panel Shop, Enterprise, etc.), or any other logical grouping based on labeling requirements.

When installed and running on a computer, the labeling application tool 220 preferably utilizes a display to guide the user through the process of creating appropriate labels. Initially, the user is presented with a listing of markets, which may be represented by an arrangement of icons on a display, each icon representing a different market and corresponding to one of the modules 222. The user may then select the market (icon), using for example, a mouse, a pointer, a keyboard, or other input device, that corresponds to the task at hand to initiate a label generation method.

In one embodiment, the labeling application tool 220 generates data, based on information supplied by the user in regard to the labeling task, including a list of legends to be printed on the labels, formatting information in regard to the legends and labels, and information on the label type. The labeling application tool 220 may then export this data to the general purpose printing application 210, where the labels can be viewed, edited, saved to memory, printed, etc.

In addition, the labeling application tool 220 may provide a label print verification function. This function signals to the user that all required labels for a particular job have been printed, or alternatively, that all required labels failed to print. This may provide a check for the user that the labeling task has been completed accurately and all required labels have been applied.

Figure 3:
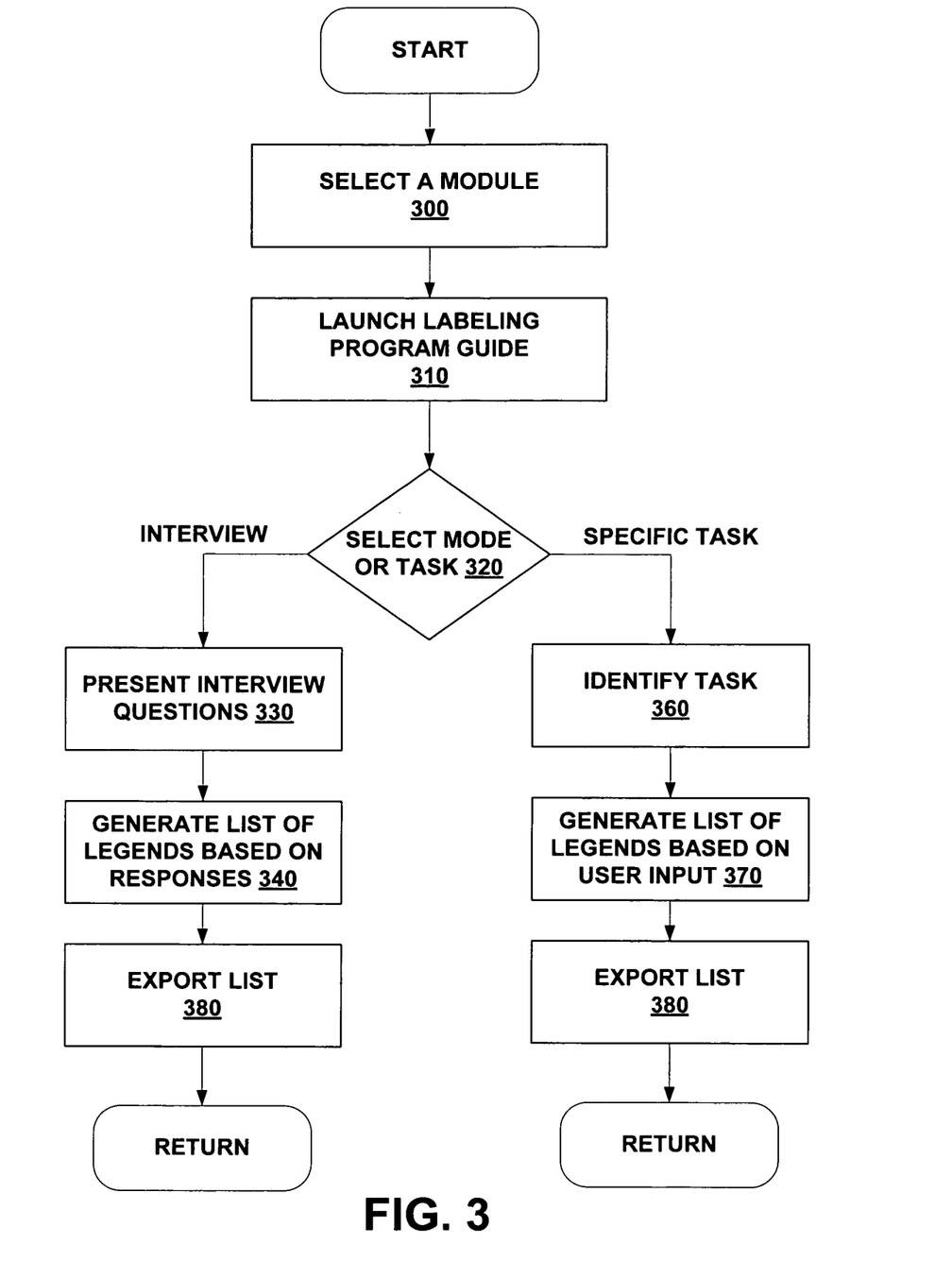
FIG. 3 is a flow chart illustrating an embodiment of a market-based labeling method.

FIG. 3 is a flow chart illustrating an embodiment of a market-based labeling method. At step 300, a user initiates the labeling method by selecting a module 222 for the desired market. As noted above, the selection may be signaled by using a mouse, pointer, keyboard or other input device. When the user selects a module, a labeling program, which is preferably specific to the selected module, is launched to guide the user in creating labels for the market, as illustrated at step 310.

Next, as illustrated at step 320, the module may present the user with various process options that may be selected to generate a list of label legends. The list of label legends includes the information that is ultimately to be printed on labels. In addition, where the labeling application tool 220 is set up to interface with a general purpose printing application 210, the list of label legends may include additional information that may be used, for example, by the general purpose printing application 210 to set printing parameters and formats. In the embodiment of FIG. 3, the user is presented at step 320 with two process options: the user may select an "interview" mode or the user may select a specific labeling task.

If interview mode is selected, the user is presented at step 330 with interview questions. The interview questions preferably are structured to obtain all information that is required from the user to generate the labels for the project. For example, when the labeling requirements for a project are defined by a specification or standard, the interview questions are arranged and presented to assure compliance with the specification or standard. A specific example, including interview questions, for labeling structures in the Enterprise Market in compliance with the telecommunications labeling standard ANSI/TIA/EIA-606-A is provided below.

Next, at step 340, the module 222 of the labeling application tool 220 generates a list of label legends based on the user's responses to the interview questions. The list of label legends may then, either automatically or upon user command, be exported at step 350 to a label file in the general purpose printing application 210. Once the list of label legends is in the label file, the general purpose printing application 210 may be used to view, edit, manipulate, print, save, etc. the content of the label file, for example as if the label file had been originally created using the general purpose printing application 210. Of course, the functionality of the general purpose printing application 210 may alternatively be combined into the labeling application tool 220 to thereby produce a single software program that provides the modular market labeling functionality described herein along with the editing, formatting, saving, etc. capabilities of the general purpose printing application 210. In this case, the exporting step 350 is eliminated.

Returning to step 320 in FIG. 3, if the user selects the specific labeling task option, the user is prompted at step 360 to identify a particular labeling task, for example from a list of items associated with the selected module. The list of items may include all items that are typically part of a labeling project for the market associated with the selected module. Depending upon the identified labeling task, the user may be presented with a sequence of screens, windows or dialog boxes, for example in a branching tree structure, to specifically identify the item to be labeled.

Based upon the user input at step 360, the module 222 of the labeling application tool 220 generates a list of label legends. As described above, the list of label legends may then be exported, as shown at step 380, to a label file in a general purpose printing application 210. As noted above, once the list of label legends is in the label file, the general purpose printing application 210 may be used to view, edit, manipulate, print, save, etc. the content of the label file. Alternatively, the functionality of the general purpose printing application 210 may be incorporated into the labeling application tool 220 and the step 380 eliminated.

As suggested above, the functions performed to accomplish the method of FIG. 3 may be provided by the labeling application tool 220 shown in FIG. 2. Nonetheless, the preferred embodiments are not limited to the software hierarchy illustrated in FIG. 2. Rather, it is envisioned that at least the general purpose printing application 210 and the labeling application tool 220 may be combined into a single software program, with or without the modular character of the illustrated labeling application tool 220. The flexibility of the arrangement shown in FIG. 2, however, arises from its modular nature. In particular, with the arrangement of FIG. 2, the user would only need to install those modules 222 that relate to the user's labeling needs.

Figure 4A:
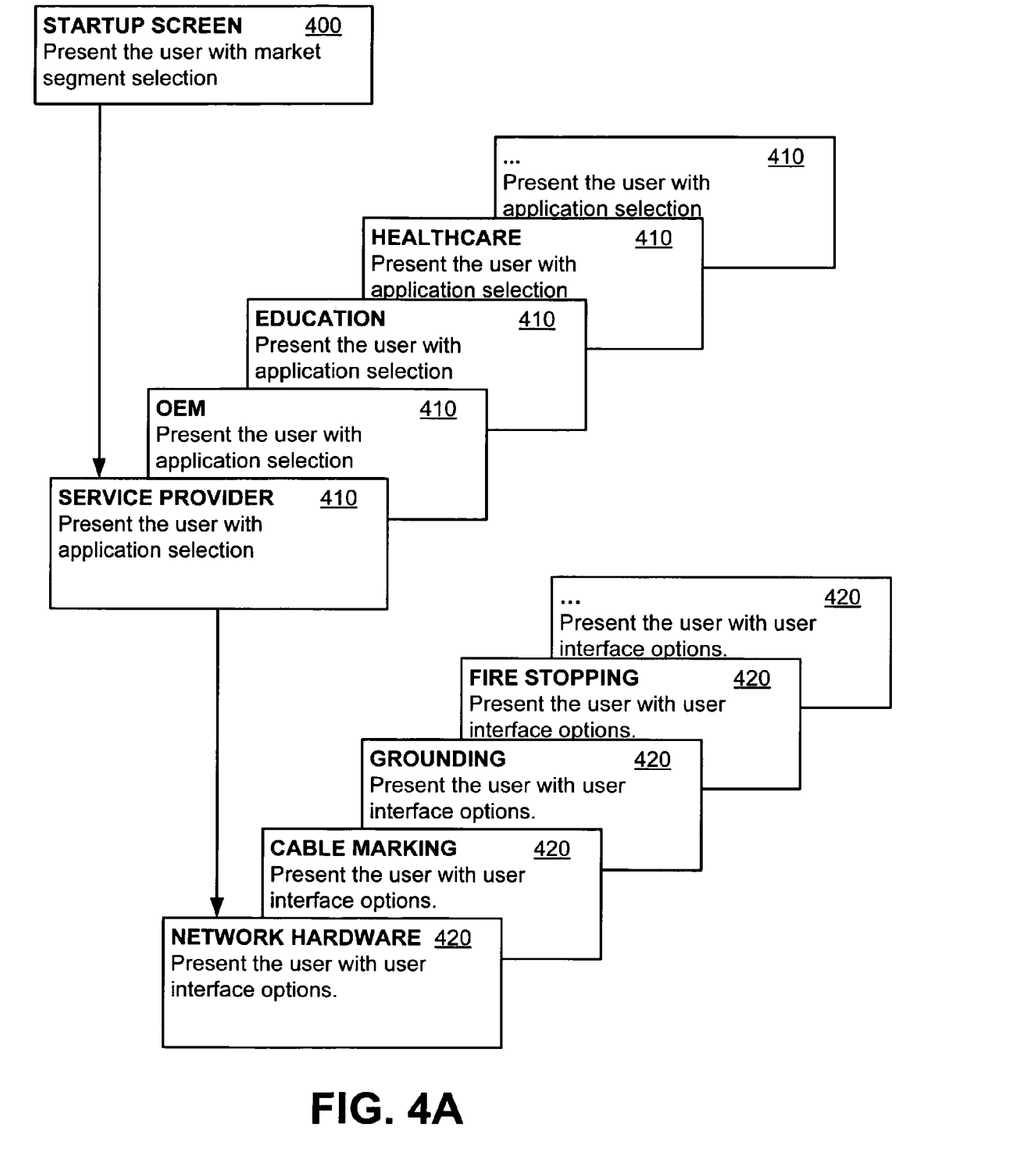
FIGS. 4A and 4B are a flow charts illustrating another embodiment of a market-based labeling method.
Figure 4B:
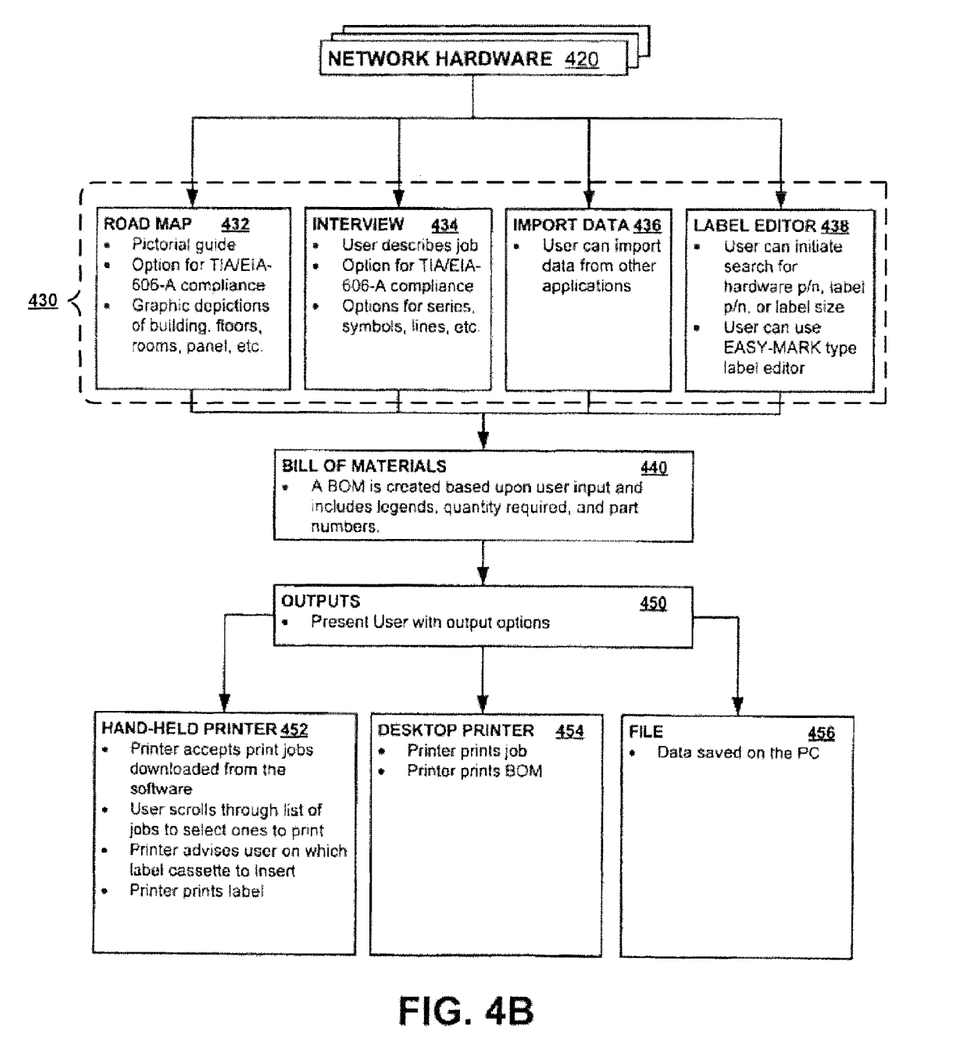

FIGS. 4A and 4B are flow charts illustrating another embodiment of a market-based labeling method. At startup, step 400, the user is presented with market segment selections. For example, FIG. 4A presents the following markets for selection: Service Provider, Original Equipment Manufacturer, Education and Healthcare. In an embodiment according to the structure shown in FIG. 2, each of these markets may constitute a separate module 222 in the labeling application tool 220. As noted above, it is not necessary, however, that the labeling application tool 220 be modular. Rather, a variety of markets may alternatively be presented together by the labeling application tool 220.

At step 410, the user selects the Service Provider market and is presented, at step 420, with a variety of selectable labeling tasks encountered in the Service Provider market. At step 420, the user indicates that he or she is interested in labeling Network Hardware.

Next at FIG. 4B and as illustrated at step 430, the user is presented with a number of process options for generating a bill of materials for the task, in this case generating network hardware labels. The user may select the desired option for determining the required label information. One option, shown at step 432, is referred to herein as the Road Map. When the user selects the Road Map option, the user is pictorially guided through the process of identifying the specific items of network hardware that need to be labeled. In this context, "pictorially guided" means that the Road Map may present graphic depictions of the facilities (e.g., building, floor, room, etc.) and/or items (panel, rack, outlet, etc.) to be labeled. The graphic depictions may be presented to the user on a display associated, for example, with the computer 100. Like the interview process described above, the Road Map option may be structured to assure compliance with any specification or standard, such as the TIA/EIA-606-A standard.

A second process option, shown at step 434, is interview mode, which is described above with reference to steps 320 and 330 of FIG. 3. If interview mode is selected, then the labeling application tool 220 solicits responses from the user to determine the scope and bounds of the labeling task. The responses may be solicited, for example, by presenting the user with questions, checkboxes, and/or text edit windows on a display associated with the computer 100. As shown in FIG. 4, the interview may be structured to assure compliance with one or more labeling standards. As an optional feature, the labeling application tool 220 may cause the general purpose printing application 210 to insert company logos on labels, to automatically serialize labels (e.g. 1, 2, 3 or a, b, c), or to simply print boxes or lines within labels rather than printing text.

Another process option, shown at step 436, is Import Data. If Import Data is selected, then the user is prompted to identify a data file for importation, where the data file identifies the requirements for the labeling task. The data file may be a label file in a general purpose printing application 210, such as a label file created from a previous use of the labeling application tool 220. Alternatively, the data file may be imported from and/or include data generated by other application software, such as spreadsheet or design tools like Microsoft Excel, Auto-CAD, etc.

Yet another process option, shown at step 438, is Label Editor. When the user selects Label Editor, a general purpose printing application 210, such as the EASY-MARK Labeling Software, available from Panduit Corp., is initiated and the user may manually input the legends for the labeling task. While using Label Editor, the labeling application tool 220 may provide a portal so that the user may access other resources, which may be stored locally or at remote locations, to search for and/or obtain information in regard to the labeling task. For example, such information may include a part number for the network hardware that is to be labeled, a part number for a particular label, label size, etc.

It is not necessary that the labeling application tool 220 provide all of the process options described above with reference to steps 430 through 438 of FIG. 4B, or step 320 of FIG. 3. To the contrary, it is envisioned that more or fewer process options may alternatively be used, and the above-described process options may be combined in a number of alternative ways. For example, interview mode may be the only process option, or the labeling application tool 220 may allow the user to select between the specific labeling task option described with reference to step 320 and the Label Editor option described at step 438.

After the user completes the selected process option, the method proceeds to step 440, where the labeling application tool generates a bill of materials for the labeling task. The bill of materials is based on the user input/responses at step 430 and may include, for example, a list of label legends, label quantities, and label part numbers. The bill of materials may include additional information as well, including information, such as part numbers and quantities, in regard to the item(s) to be labeled. At step 450, the user may be presented with a number of output options. Output options define the output form of the data generated by the labeling application tool. One output option, described above with reference to FIG. 3, is to export the label data to a label file in the general purpose printing application 210, where it can be viewed, edited, saved, etc. Alternative output options are presented in FIG. 4. For example, at step 452, the labeling application tool sends the output data in the form of a print job, or series of print jobs, to a hand-held printer. The printer accepts the print job(s) and may allow the user to scroll through accepted print jobs to select a job for printing. The printer is preferably adapted to notify the user of the label stock, or type of label, that should be loaded into the printer for the selected print job, and print the labels. As shown at step 454, the output data may alternatively be sent as a print job, or series of print jobs, to a desktop printer, which may then print the labels and/or the bill of materials. Another option, shown at step 456, is to save the output data to memory in the computer 100 or a memory accessible to the computer 100.

The output data options noted above may be provided by the labeling application tool 220. Alternatively, the labeling application tool 220 may, for example, export the bill of materials information to the general purpose printing application 210, which may then in turn provide the various output data options.

EXAMPLES

The following examples describe a labeling application tool that is adapted to generate labels for a specific market. Specifically, an example is provided for a labeling application tool, or a module in a labeling application tool, that generates labels in the Enterprise Market, and another example is provided for a labeling application tool, or a module in a labeling application tool, that generates labels in the Panel Shop Market. As used herein, the Enterprise Market refers to any private data-communications network infrastructure. In the Enterprise Market, labeling requirements may be governed by standard, e.g., ANSI/TIA/EIA-606-A, entitled Administration Standard for Commercial Telecommunications Infrastructure, which is available from the Telecommunications Industry Association in Arlington, Va. The entire contents of ANSI/TIA/EIA-606-A are incorporated herein by reference. As used herein, the Panel Shop Market refers to any facility including manufacturers, installers or maintainers of wiring cabinets or control panels containing electrical components and/or wiring. In the context of FIG. 2, these two examples may be, but are not required to be, implemented as distinct modules 222 in the labeling application tool 220. These examples are presented for purposes of illustration, not limitation.

A. Enterprise Market Module

The Enterprise Market module produces labels for tasks that are specific to the Enterprise Market and presents the user with user interfaces, such as on a display associated with the computer 100, that are tailored to the needs of an Enterprise Market user. In this example, an icon, selectable menu item or other method for launching the subroutine for the Enterprise Market module may appear with a screen for the general purpose printing application 210. The user may launch a labeling program guide for the Enterprise Market module by clicking on the icon (this example generally follows the flow of FIG. 3) and the user is presented with a choice of interview mode, conforming to ANSI/TIA/EIA-606-A, or selecting a specific labeling task. In this stage, the module gathers information from the user via, for example, a series of user interfaces, questions, checkboxes or dialog boxes, about a labeling task in the Enterprise Market.

If the user selects the ANSI/TIA/EIA-606-A interview mode, the labeling application tool automatically presents the user with a series of questions, through a user interface, in a manner that aids compliance with the labeling requirements of ANSI/TIA/EIA-606-A. An example of one series of questions is set forth below: Telecommunication Space ("TS") Identifier
    What Floor?→f
    What Space?→s
    Add another TS?
        Yes—Save data and start from top
        No—Continue
    What Printer are you using?
        Laser/Inkjet
        TDP43M/PTR2E or Thermal Transfer Printer
        Dot Matrix
    Select label?
        List of all Optimum label sizes
    Finish TS Interview
        Populates labels on selected label format with data entered
        TS identifier=fs
    Print Identifiers Horizontal Link ("HL") Identifier
    What Floor?→f
    What Space?→s
    What Rack/Patch Panel?→a
    What Port Range?→$n_x$ through $n_y$
    Add another Floor, Space, Rack, Port?
        Yes—Save data and start from top
        No—Continue
    What Printer are you using?
        Laser/Inkjet
        TDP43M/PTR2E or Thermal Transfer Printer
        Dot Matrix
    Select label?
        List of all Optimum label sizes
    Finish HL Interview
        Populates labels on selected label format with data entered
        HL identifiers=fs-an$_x$, through fs-an$_y$
    Print Identifiers Telecommunications Main Grounding Busbar ("TMGB") Identifier
    What Floor?→f
    What Space?→s
    Add another TMGB?
        Yes—Save data and start from top
        No—Continue
    What Printer are you using?
        Laser/Inkjet
        TDP43M/PTR2E or Thermal Transfer Printer
        Dot Matrix
    Select label?
        List of all Optimum label sizes
    Finish TMGB Interview
        Populates labels on selected label format with data entered
        TMGB identifier=fs-TMGB
    Print Identifiers Telecommunications Grounding Busbar ("TGB") Identifier
    What Floor?→f
    What Space?→s
    Add another TGB?
        Yes—Save data and start from top
        No—Continue
    What Printer are you using?
        Laser/Inkjet
        TDP43M/PTR2E or Thermal Transfer Printer
        Dot Matrix Select label?
　List of all Optimum label sizes
Finish TGB Interview
　Populates labels on selected label format with data entered
　TGB identifier=fs-TGB
Print Identifiers
Building Backbone Cable ("BBC") Identifier
　What is Floor 1?→$f_1$
　What Space 1?→$s_1$
　What is Floor 2?→$f_2$
　What Space 2?→$s_2$
　What Building Backbone Cable Name?→n
　Add another Building Backbone Cable?
　　Yes—Save data and start from top
　　No—Continue
　What Printer are you using?
　　Laser/Inkjet
　　TDP43M/PTR2E or Thermal Transfer Printer
　　Dot Matrix
　Select label?
　　List of all Optimum label sizes
　Finish BBC Interview
　　Populates labels on selected label format with data entered
　　BBC identifier=$f_1 s_1/f_2 s_2$–n
　Print Identifiers
Building Backbone Pair ("BBP") or Optical Fiber Identifier
　What is Floor 1?→$f_1$
　What Space 1?→$s_1$
　What is Floor 2?→$f_2$
　What Space 2?→$s_2$
　What Building Backbone Cable Name?→n
　What name for Copper pair or Optical Fiber?→d
　Add another Building Backbone Pair or Optical Fiber?
　　Yes—Save data and start from top
　　No—Continue
　What Printer are you using?
　　Laser/Inkjet
　　TDP43M/PTR2E or Thermal Transfer Printer
　　Dot Matrix
　Select label?
　　List of all Optimum label sizes
　Finish BBP Interview
　　Populates labels on selected label format with data entered
　　BBP identifier=$f_1 s_1/f_2 s_2$–n.d
　Print Identifiers
Firestopping Location ("FSL")
　What Floor?→f
　What Location?→n
　What Hour Rating?→h
　Add another FSL?
　　Yes—Save data and start from top
　　No—Continue
　What Printer are you using?
　　Laser/Inkjet
　　TDP43M/PTR2E or Thermal Transfer Printer
　　Dot Matrix
　Select label?
　　List of all Optimum label sizes
　Finish FSL Interview
　　Populates labels on selected label format with data entered
　　FSL identifier=f-FSLn(h)
　Print Identifiers
Campus Backbone Cable ("CBC")
　What is Building 1?→$b_1$
　What is Floor 1?→$f_1$
　What Space 1?→$s_1$
　What is Building 2?→$b_2$
　What is Floor 2?→$f_2$
　What Space 2?→$s_2$
　What Building Backbone Cable Name?→n
　Add another Campus Backbone Cable?
　　Yes—Save data and start from top
　　No—Continue
　What Printer are you using?
　　Laser/Inkjet
　　TDP43M/PTR2E or Thermal Transfer Printer
　　Dot Matrix
　Select label?
　　List of all Optimum label sizes
　Finish CBC Interview
　　Populates labels on selected label format with data entered
　　CBC identifier=$[b_1\text{-}f_1 s_1]/[b_2\text{-}f_2 s_2]$–n
　Print Identifiers
Campus Backbone Pair ("CBP") or Optical Fiber Identifier
　What is Building 1?→$b_1$
　What is Floor 1?→$f_1$
　What Space 1?→$s_1$
　What is Building 2?→$b_2$
　What is Floor 2?→$f_2$
　What Space 2?→$s_2$
　What Building Backbone Cable Name?→n
　What name for Copper pair or Optical Fiber?→d
　Add another Campus Backbone Pair or Optical Fiber?
　　Yes—Save data and start from top
　　No—Continue
　What Printer are you using?
　　Laser/Inkjet
　　TDP43M/PTR2E or Thermal Transfer Printer
　　Dot Matrix
　Select label?
　　List of all Optimum label sizes
　Finish CBP Interview
　　Populates labels on selected label format with data entered
　　CBP identifier=$[b_1\text{-}f_1 s_1]/[b_2\text{-}f_2 s_2]$–n.d
　Print Identifiers If, on the other hand, the user selects the specific labeling task option, the user is presented with a list of potential labeling tasks that may be selected by clicking, checking, etc. For example, the list of potential labeling tasks in the Enterprise Market module may include: Cable Markers, Patch Panel Labels, Rack Labels, Outlet Labels, Port Labels, Patch Cord Labels, Fire stopping Location Labels, Room Labels, and Grounding Busbar Labels. Information entered by the user is interpreted by the module, which then creates a list of label legends.

Regardless of the selected information collection mode, the information entered by the user may be used by the labeling application tool 220 to automatically select appropriate label formats, create the desired legends to be printed on labels, format the data/legends on the selected labels in a manner that is appropriate for the labeling task, and/or export the legends into label files in the general purpose printing application. The information entered by the user may also be used to automatically open a particular label format or label part number, set file parameters and formats, etc. within the label file upon return to the general purpose printing application.

B. Panel Shop Market Module

The Panel Shop Market module produces labels for tasks that are specific to the Panel Shop Market and presents the user with user interfaces, such as on a display associated with the computer 100, that are tailored to the needs of a Panel Shop Market user. In this example, an icon selectable menu item or other method for launching the subroutine for the Panel Shop Market module may appear on a screen for the general purpose printing application 210. The user may launch a labeling program guide for the Panel Shop Market module by clicking on the icon selectable menu item or other method for launching the subroutine, and the user is prompted to select a labeling task from a list of labeling tasks for a typical Panel Shop. For example, the list of labeling tasks may include: wires and cables, terminal blocks/strips, electromechanical devices, electrical components, programmable controllers, safety signs, rating plates, and pushbuttons and switches.

The labeling application tool 220 then solicits the information that is needed from the user to complete the labeling task. FIGS. 5A through 5F illustrate a series of screen shots for a case in which the user selects "wires and cables" from the list of labeling tasks in the Panel Shop module.

Figure 5A:
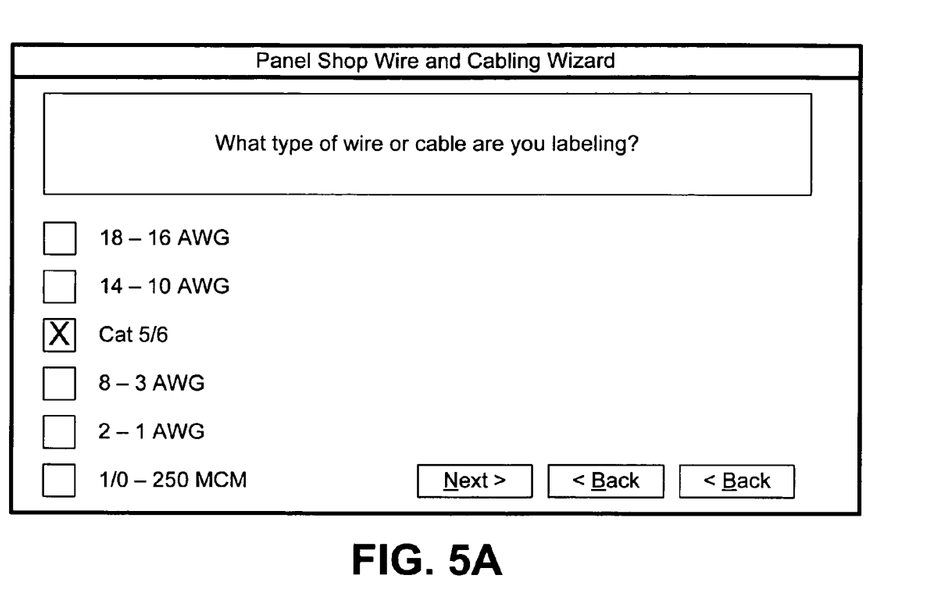
FIGS. 5A through 5F illustrate a series of screen shots generated by the labeling application tool for guiding a user through the labeling of wires or cables in a Panel Shop module.
Figure 5B:
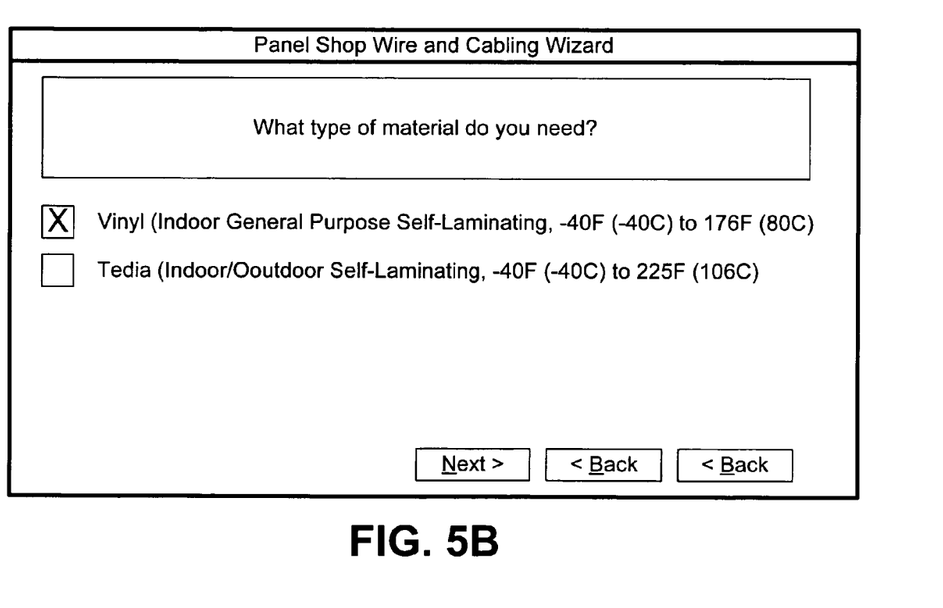
Figure 5C:
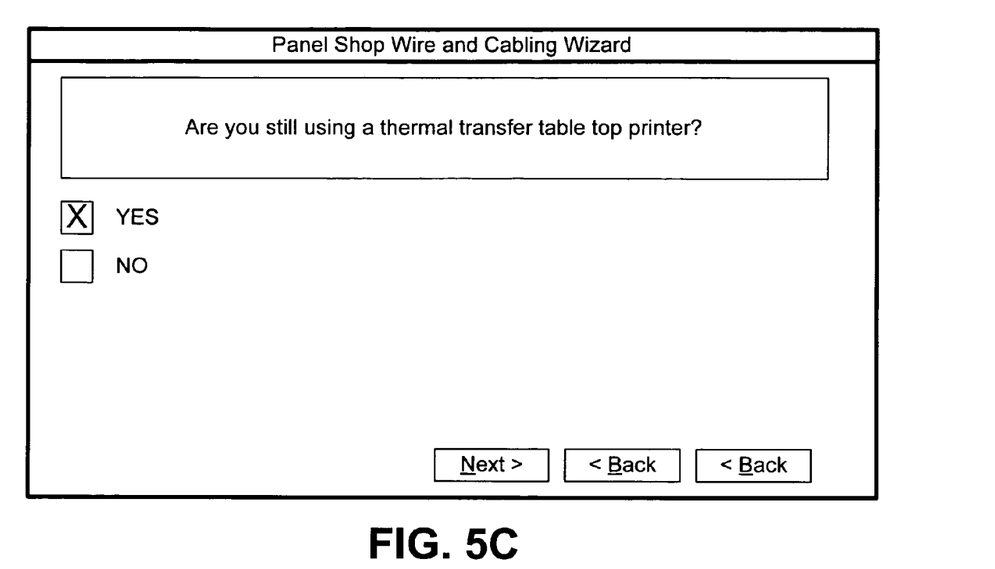
Figure 5D:
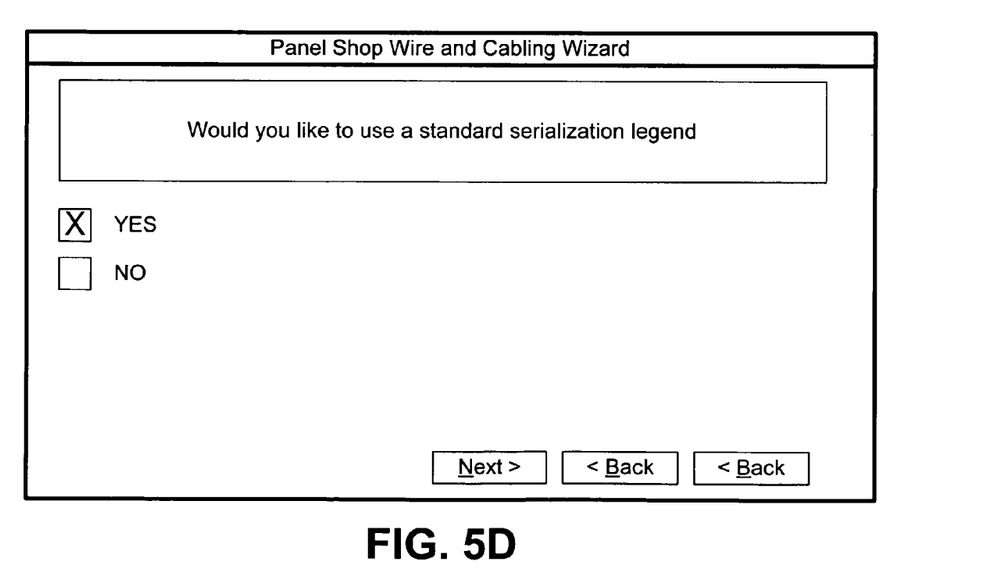

In FIG. 5A, the labeling application tool 220 determines what type of wire or cable the user is labeling. The user has indicated Cat "⅝" wire or cable. FIG. 5B then presents options for the label material, and the user selects vinyl. In FIG. 5C the labeling application tool determines what type of printer the user wants to use. FIG. 5D solicits information from the user on serialization of the legends for the labels. In this example, the user has selected a standard serialization legend. Based on the information collected in regard to this task of labeling wires and cables, the labeling application tool then generates a list of legends and exports the list, along with other printing parameters such as the label format, to the general purpose printing application 210.

Figure 5E:
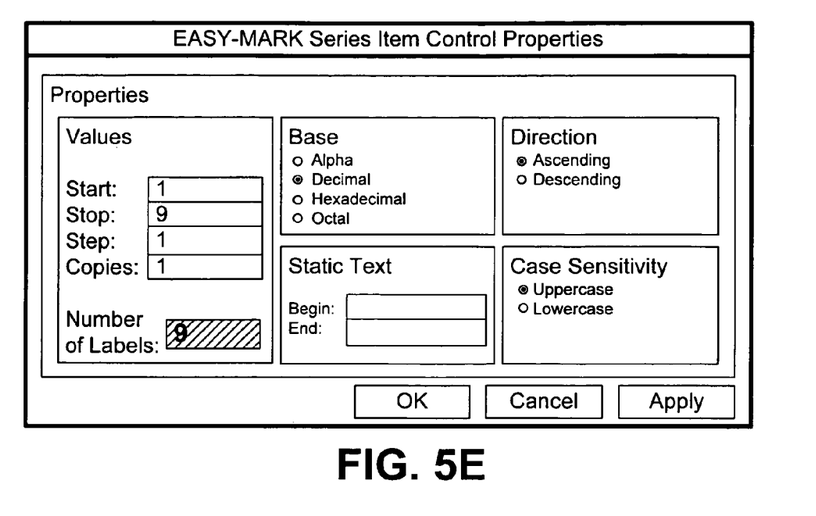
Figure 5F:
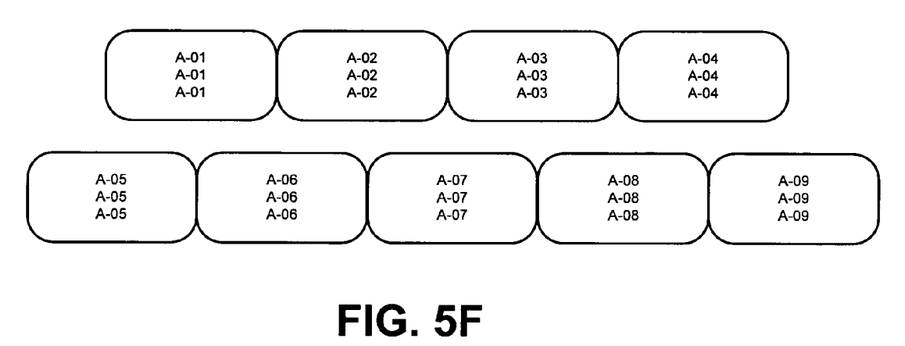

FIG. 5E is a screen shot of a label properties window from a general purpose printing application 210, in this case the EASY-MARK Labeling Software, from Panduit Corp. It illustrates that, based on the information gathered in FIGS. 5A through 5D, the user wants to print nine wire labels, using an ascending decimal serialization. FIG. 5F is a preview of the resulting labels, which may be printed, saved, edited, etc., using the general purpose printing application 210. In this example, the legends exported from the Panel Shop module have been automatically inserted into label files in the general purpose printing application.

Like the Enterprise Market module, the Panel Shop Market module is capable of utilizing the information obtained from the user to automatically select appropriate label formats (e.g., label size and material), create the legends to be printed on the labels, format the legends on the labels in a manner that is appropriate for the labeling task, and export the legends and associated formatting and label information to a label file in a general purpose printing application.

Various modules 222, e.g., each corresponding to a different market, are preferably available to the user, such as through download from a resource 130. Of course, the modules 222 may alternatively be installed from a CD or other memory media. The modules 222 may be readily adapted to other languages to make the labeling application tool more flexible and useful on a worldwide basis.

The labeling application tool may be utilized to generate a wide variety of label types, including but not limited to self-laminating or wraparound labels, continuous strips of self-adhesive material, die-cut self-adhesive labels, self-adhesive signs with text and graphics, self-adhesive labels with text and graphics, and die-cut self-adhesive laminated labels. Perhaps more importantly, the labeling application tool may automatically select all the appropriate label types for the user's labeling task. The selection of the appropriate label type may be automatically made based on information about the item(s) being labeled, information from specifications or standards, or other sources.

The labeling application tool described herein provides a number of advantages for users undertaking the labeling task. The modular structure, if utilized, not only allows the user to install only those modules that are to be used, but also associates labeling tasks with specific markets, so that it is unnecessary for the user to have highly specialized knowledge about the item(s) to be labeled, governing standards and/or specifications, label types and formats, etc. In addition, the variety of described process options provides a flexible and user-friendly approach to the labeling task. The user interfaces, lists and interviews are relatively intuitive in comparison with existing labeling software, so that less training of the user in the use of the labeling application tool is required and the user may spend less time creating labels. In addition, by automating label definition and the generation of a list of label legends, label selection and data entry errors are reduced, providing savings in time and material expense.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the spirit and scope of the present invention. Although specific terms are employed herein, they are used in a generic and descriptive sense only and not for purposes of limitation.

We claim:

1. A label-generating system comprising:
at least one processor;
a user interface comprising at least one input/output device; and
a labeling application comprising instructions executable by the at least one processor for causing the label-generating system to carry out a set of functions, the set of functions including:
presenting via the user interface a set of groupings of related labeling tasks;
receiving via the user interface a selection of a grouping from among those presented, and responsively presenting via the user interface a set of process options for generating label-set data defining a set of labels related to the selected grouping, the label-set data comprising respective legends for the labels, the set of process options including a project option and a specific-labeling-task option;
receiving via the user interface a selection of a process option from among those presented, where
if the selected process option is the specific-labeling-task option, presenting via the user interface a list of the related labeling tasks in the selected grouping, receiving via the user interface a selection of a specific labeling task from among the related labeling tasks presented, presenting via the user interface a first navigable sequence of interfaces specific at least in part to the selected specific labeling task, receiving via the first sequence of interfaces at least one user first input, and using the at least one user first input to generate the label-set data for the selected specific labeling task, and where
  if the selected process option is the project option, for each of the related labeling tasks in the selected group:
    presenting via the user interface a second navigable sequence of interfaces specific at least in part to the respective related labeling task, receiving via the second sequence of interfaces at least one user second input, and using the at least one user second input to generate the label-set data for the respective related labeling task; and
  using the label-set data to produce at least one of (i) an output file useable for printing at least one set of labels in accordance with the label-set data, (ii) an output file that enables a general-purpose printing application to print at least one set of labels in accordance with the label-set data, (iii) a print job that enables at least one printer to print at least one set of labels in accordance with the label-set data, and (iv) at least one set of output data stored in at least one memory and useable for printing at least one set of labels in accordance with the label-set data.

2. The label-generating system of claim 1, wherein the at least one of the groupings of related labeling tasks is grouped pursuant to a predetermined labeling standard.

3. The label-generating system of claim 1, wherein the label-set data is formatted pursuant to a predetermined labeling standard.

4. The label-generating system of claim 1, wherein if the selected process option is the project option, at least one of the second navigable sequence of interfaces specific at least in part to the respective related labeling task is dependent on an earlier-generated label-set data for some other related labeling task.

5. The label-generating system of claim 1, wherein if the selected process option is the project option, at least one of the second navigable sequence of interfaces specific at least in part to the respective related labeling task is dependent on the at least one user second input from some other related labeling task.

6. The label-generating system of claim 1, wherein at least one of one of said first navigable sequence of interfaces and one of said second navigable sequence of interfaces includes a pictorial depiction of at least one of a facility and an item to be labeled.

7. The label-generating system of claim 1, wherein at least one of one of said first navigable sequence of interfaces and one of said second navigable sequence of interfaces includes at least one of a checkbox and a dialog box.

8. The label-generating system of claim 1, further comprising a printer coupled to the system.

9. The label-generating system of claim 1, wherein the at least one input/output device comprises a keyboard and a display.

10. The label-generating system of claim 1, wherein the labeling application comprises at least two modules respectively corresponding to groupings in the set of groupings of related labeling tasks, wherein each such module is adapted for generating labels for the corresponding grouping.

11. A method carried out by a label-generating system comprising at least one processor, a user interface comprising at least one input/output device, and a labeling application comprising instructions executable by the at least one processor for causing the label-generating system to carry out the method, which comprises the steps of:
  presenting via the user interface a set of groupings of related labeling tasks;
  receiving via the user interface a selection of a grouping from among those presented, and responsively presenting via the user interface a set of process options for generating label-set data defining a set of labels related to the selected grouping, the label-set data comprising respective legends for the labels, the set of process options including a project option and a specific-labeling-task option;
  receiving via the user interface a selection of a process option from among those presented, where
    if the selected process option is the specific-labeling-task option, presenting via the user interface a list of the related labeling tasks in the selected grouping, receiving via the user interface a selection of a specific labeling task from among the related labeling tasks presented, presenting via the user interface a first navigable sequence of interfaces specific at least in part to the selected specific labeling task, receiving via the first sequence of interfaces at least one user first input, and using the at least one user first input to generate the label-set data for the selected specific labeling task, and where
    if the selected process option is the project option, for each of the related labeling tasks in the selected group:
      presenting via the user interface a second navigable sequence of interfaces specific at least in part to the respective related labeling task, receiving via the second sequence of interfaces at least one user second input, and using the at least one user second input to generate the label-set data for the respective related labeling task; and
  using the label-set data to produce at least one of (i) an output file useable for printing at least one set of labels in accordance with the label-set data, (ii) an output file that enables a general-purpose printing application to print at least one set of labels in accordance with the label-set data, (iii) a print job that enables at least one printer to print at least one set of labels in accordance with the label-set data, and (iv) at least one set of output data stored in at least one memory and useable for printing at least one set of labels in accordance with the label-set data.

12. The method of claim 11, wherein at least one of the groupings of related labeling tasks is grouped pursuant to a predetermined labeling standard.

13. The label-generating system of claim 11, wherein the label-set data is formatted pursuant to a predetermined labeling standard.

14. The method of claim 11, wherein if the selected process option is the project option, at least one of the second navigable sequence of interfaces specific at least in part to the respective related labeling task is dependent on an earlier-generated label-set data for some other related labeling task.

15. The method of claim 11, wherein if the selected process option is the project option, at least one of the second navigable sequence of interfaces specific at least in part to the respective related labeling task is dependent on the at least one user second input from some other related labeling task.

16. The method of claim 11, wherein at least one of one of said first navigable sequence of interfaces and one of said second navigable sequence of interfaces includes a pictorial depiction of at least one of a facility and an item to be labeled.

17. The method of claim 11, wherein at least one of one of said first navigable sequence of interfaces and one of said second navigable sequence of interfaces includes at least one of a checkbox and a dialog box.

18. The method of claim 11, wherein the at least one input/output device comprises a keyboard and a display.

* * * * *